United States Patent
Koizumi

(10) Patent No.: US 7,631,174 B2
(45) Date of Patent: Dec. 8, 2009

(54) METHOD OF UPDATING FIRMWARE IN COMPUTER SERVER SYSTEMS

(75) Inventor: Tohru Koizumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 480 days.

(21) Appl. No.: 11/166,273

(22) Filed: Jun. 27, 2005

(65) Prior Publication Data
US 2006/0212694 A1 Sep. 21, 2006

(30) Foreign Application Priority Data
Mar. 16, 2005 (JP) ............................. 2005-075546

(51) Int. Cl.
G06F 1/24 (2006.01)
G06F 9/00 (2006.01)
G06F 9/44 (2006.01)
G06F 15/177 (2006.01)

(52) U.S. Cl. ................ 713/1; 713/2; 713/100; 717/168

(58) Field of Classification Search ............... 713/1, 713/2, 100; 717/168
See application file for complete search history.

(56) References Cited

U.S. PATENT DOCUMENTS

| | | | | |
|---|---|---|---|---|
| 5,793,943 | A * | 8/1998 | Noll ............................ | 714/6 |
| 6,675,258 | B1 | 1/2004 | Bramhall et al. | |
| 6,754,828 | B1 * | 6/2004 | Marisetty et al. ............. | 726/2 |
| 6,892,323 | B2 * | 5/2005 | Lin ............................ | 714/36 |
| 7,000,103 | B2 * | 2/2006 | Lin ............................ | 713/100 |
| 7,188,238 | B2 * | 3/2007 | Bulusu et al. ................ | 713/2 |
| 7,222,339 | B2 * | 5/2007 | Rothman et al. ............ | 717/168 |
| 7,237,075 | B2 * | 6/2007 | Welsh et al. ................ | 711/162 |
| 7,293,165 | B1 * | 11/2007 | Tobias ......................... | 713/1 |
| 7,305,668 | B2 * | 12/2007 | Kennedy et al. ............ | 717/168 |
| 7,337,309 | B2 * | 2/2008 | Nguyen et al. ............... | 713/1 |
| 7,409,539 | B2 * | 8/2008 | Arnez et al. ................ | 713/100 |
| 2001/0044934 | A1 | 11/2001 | Hirai et al. | |
| 2002/0092008 | A1 | 7/2002 | Kehne et al. | |
| 2004/0015941 | A1 | 1/2004 | Sekine | |
| 2004/0030877 | A1 | 2/2004 | Frid | |
| 2004/0076043 | A1 | 4/2004 | Boals et al. | |
| 2004/0098521 | A1 * | 5/2004 | Lin ............................ | 710/72 |
| 2004/0163081 | A1 | 8/2004 | Martwich | |
| 2004/0193865 | A1 * | 9/2004 | Nguyen et al. ............... | 713/2 |
| 2004/0236936 | A1 * | 11/2004 | Bulusu et al. ................ | 713/2 |

(Continued)

FOREIGN PATENT DOCUMENTS

DE EP 04103819 * 8/2004

(Continued)

OTHER PUBLICATIONS

European Search Report dated Jul. 10, 2006 issued in corresponding European Patent Application.

(Continued)

*Primary Examiner*—Mark Connolly
(74) *Attorney, Agent, or Firm*—Fujitsu Patent Center

(57) ABSTRACT

A method of updating firmware in a computer server system is disclosed which method includes disconnecting access from a south bridge to a flash memory when the system is in an operating state; writing an updating firmware from a terminal to the flash memory via a base-board management controller; and thereafter, rebooting.

3 Claims, 6 Drawing Sheets

U.S. PATENT DOCUMENTS

| | | | |
|---|---|---|---|
| 2005/0144613 A1* | 6/2005 | Tseng .......................... | 717/168 |
| 2005/0216753 A1* | 9/2005 | Dailey et al. ................. | 713/191 |
| 2005/0229173 A1* | 10/2005 | Mihm et al. ................. | 717/171 |
| 2005/0251799 A1* | 11/2005 | Wang .......................... | 717/168 |
| 2006/0015781 A1* | 1/2006 | Rothman et al. ............ | 714/100 |
| 2007/0260790 A1* | 11/2007 | Chen et al. .................. | 710/110 |
| 2007/0288737 A1* | 12/2007 | Boyle ........................... | 713/1 |
| 2008/0141016 A1* | 6/2008 | Chang et al. .................. | 713/2 |

FOREIGN PATENT DOCUMENTS

| | | |
|---|---|---|
| JP | 2000-3558 | 1/2000 |
| JP | 2001-27954 | 1/2001 |
| JP | 2003-330655 | 11/2003 |

OTHER PUBLICATIONS

Office Action issued in corresponding Chinese Patent Application No. 200510084779.0, on Aug. 17, 2007.

* cited by examiner

METHOD OF UPDATING FIRMWARE IN COMPUTER SERVER SYSTEMS

BACKGROUND OF THE INVENTION

1. Field of the Invention

The present invention relates to a method of updating firmware in computer server systems.

2. Description of the Related Art

A computer server system has BIOS (Basic Input Output System), which is a program group for controlling connected devices such as disks, keyboards and graphic devices, and a flash memory for storing firmware retaining configuration information of the system. When changing capability of the computer server system (hereinafter, referred to simply as server system), the firmware must be updated.

FIGS. 1 and 2 are diagrams showing a conventional server system configuration and a processing flow at the time of the firmware update, respectively.

A CPU 1 is connected to a PCI bus 3 through a north bridge 2 which is one unit constituting a chip set. Also, through a south bridge 4 which is the other unit constituting the chip set, the CPU 1 is connected to a flash memory 5. Further, a legacy I/O interface 6 is connected to the PCI bus 3.

The south bridge 4 is connected with a base-board management controller (BMC) 7. The base-board management controller (BMC) 7 is a server controlling chip which acts as a central function for managing the server system as a single unit and has a failure communication function and others in case OS (operating system) goes down due to a hardware failure or the like.

If the server system is partitioned to have a plurality of systems, a plurality of base-board management controllers (BMC) 7 are correspondingly provided.

Further, the system has an interface function for a terminal 9, such as 1***Base-T or RS232C, and has a management board (MMB) 8 which manages a plurality of base-board management controllers (BMC) 7.

In the server system with such a configuration, if the firmware stored in the flash memory 5 is updated, following processing is performed in accordance with the processing flow of FIG. 2.

In a conventional method, the server system is stopped (shut down) once (step S1). Although the south bridge 4 normally read the firmware in the flash memory 5 when the system is in an operating state, if updating firmware data are stored in a storage medium 10 such as a flexible disk, the system is booted by reading the updating firmware data from the terminal 9 such as a corresponding flexible disk drive (step S2).

The read updating firmware is written into the flash memory 5 via the CPU 1 and via the south bridge 4 (as indicated by a dashed arrow of FIG. 1) (step S3). Then, the system is rebooted (step S4) to be in normal operating state. Therefore, in the conventional method, the server system is continuously in a stopped state until rebooted.

In this way, when the firmware data is updated, the server system must be put in the stopped state once. Therefore, the larger the system scale becomes, the greater the influence is.

Technologies relating to such an update of the firmware data or control program include, for example, an invention described in Japanese Patent Application Laid-Open Publication No. 2003-330655. In this invention, during execution of a control program stored in a flash ROM, a control program to be updated is saved and stored in RAM separately prepared, and when rebooted, the updated control program is enabled.

Also, an invention described in Japanese Patent Application Laid-Open Publication No. 2001-27954 is an invention relating to writing a program downloaded from a host computer. When the download is suspended, a communication coprocessor forcibly resets a main processor, and the download to a flash memory is executed by the communication coprocessor without passing through the main processor.

In an update of firmware data in the server system described with reference to FIGS. 1 and 2 above, a system must be stopped once. Also, in the invention described in Japanese Patent Application Laid-Open Publication No. 2003-330655, although a control program in execution is continuously executed, a memory must be prepared for saving. Further, in the invention described in Japanese Patent Application Laid-Open Publication No. 2001-27954, a program update is performed by forcibly resetting a main processor, and as a result, a system must be suspended.

Further, neither of the inventions described in Japanese Patent Application Laid-Open Publication Nos. 2003-330655 and 2001-27954 relates to a server system, and neither of the patent documents suggests that the update of the firmware data is enabled in the server system over a short amount of time.

SUMMARY OF THE INVENTION

It is therefore an object of the invention of this application to provide a firmware update method for enabling the firmware to be written when a server system is operating and for minimizing system down time when the firmware is updated, and to provide a server system to which the method is applied.

In order to achieve the above object, according to a first aspect of the present invention there is provided a method of updating firmware in a computer server system, the method comprising disconnecting access from a south bridge to a flash memory when the system is in an operating state; writing an updating firmware from a terminal to the flash memory via a base-board management controller; and thereafter, rebooting. The method of updating firmware of the present invention may further comprise, when the access from a south bridge to a flash memory is disconnected, interrupting a CPU from the base-board management controller via the south bridge, and banning the access to the flash memory.

To achieve the above object, according to a second aspect of the present invention there is provided a method of updating firmware, the method comprising writing updating firmware data from a terminal, via a backup-side base-board management controller, to a corresponding backup-side flash memory; and when rebooting, switching the backup-side base-board management controller and the corresponding backup-side flash memory to an active side to reboot.

To achieve the above object, according to a third aspect of the present invention there is provided a server system booted by firmware stored in a flash memory, the server system comprising a CPU; a south bridge; a flash memory; a switch operable to open and close a connection between the south bridge and the flash memory; and a base-board management controller connected to the south bridge and the flash memory, wherein when firmware of the flash memory is updated, access to the flash memory is banned by interrupting the CPU from the base-board management controller via the south bridge, and wherein updating firmware from a terminal is written to the flash memory via the base-board management controller to subsequently execute reboot. The server system of the present invention may further comprise a management board configured to control the base-board management controller, wherein when firmware of the flash memory is updated, the management board controls the switch to make the connection between the south bridge and the flash memory disconnected. In the server system of the present invention, the flash memory and the base-board management controller connected to the flash memory may correspond to one (1) system of a plurality of systems split into partitions.

In order to attain the above object, according to a fourth aspect of the present invention there is provided a server system booted by firmware stored in a flash memory, the server system comprising a CPU; a south bridge; active and backup flash memories; a switch operable to open and close a connection between the south bridge and the active and backup flash memories; and active and backup base-board management controllers connected respectively to the active and backup flash memories, wherein when firmware of the flash memories is updated, updating firmware from a terminal is written to the backup flash memory via the backup base-board management controller, and wherein at the time of reboot, the connection to the south bridge is switched from the active flash memory to the backup flash memory by the switch to reboot the system with the updated firmware. In the server system of the present invention, the active and backup flash memories and the active and backup base-board management controllers connected to the flash memories may correspond to one (1) system of a plurality of systems split into partitions.

By writing firmware when a system is operating according to the present invention, system down time can be minimized when the firmware is updated. Further, by not going through a CPU, a flash memory can be rewritten when a failure occurs at the CPU or a north bridge.

Also, in a system provided with a backup base-board management controller and flash memory, the update is performed using the backup base-board management controller and flash memory, and subsequently, by rebooting after a bus switch is switched, the similar update can be performed without banning access from a south bridge to the firmware.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Embodiments of the present invention will now be described with reference to the accompanying drawings. The embodiments are for the purpose of understanding the present invention, and the technical scope of the present invention is not limited to these embodiments.

Figure 3:
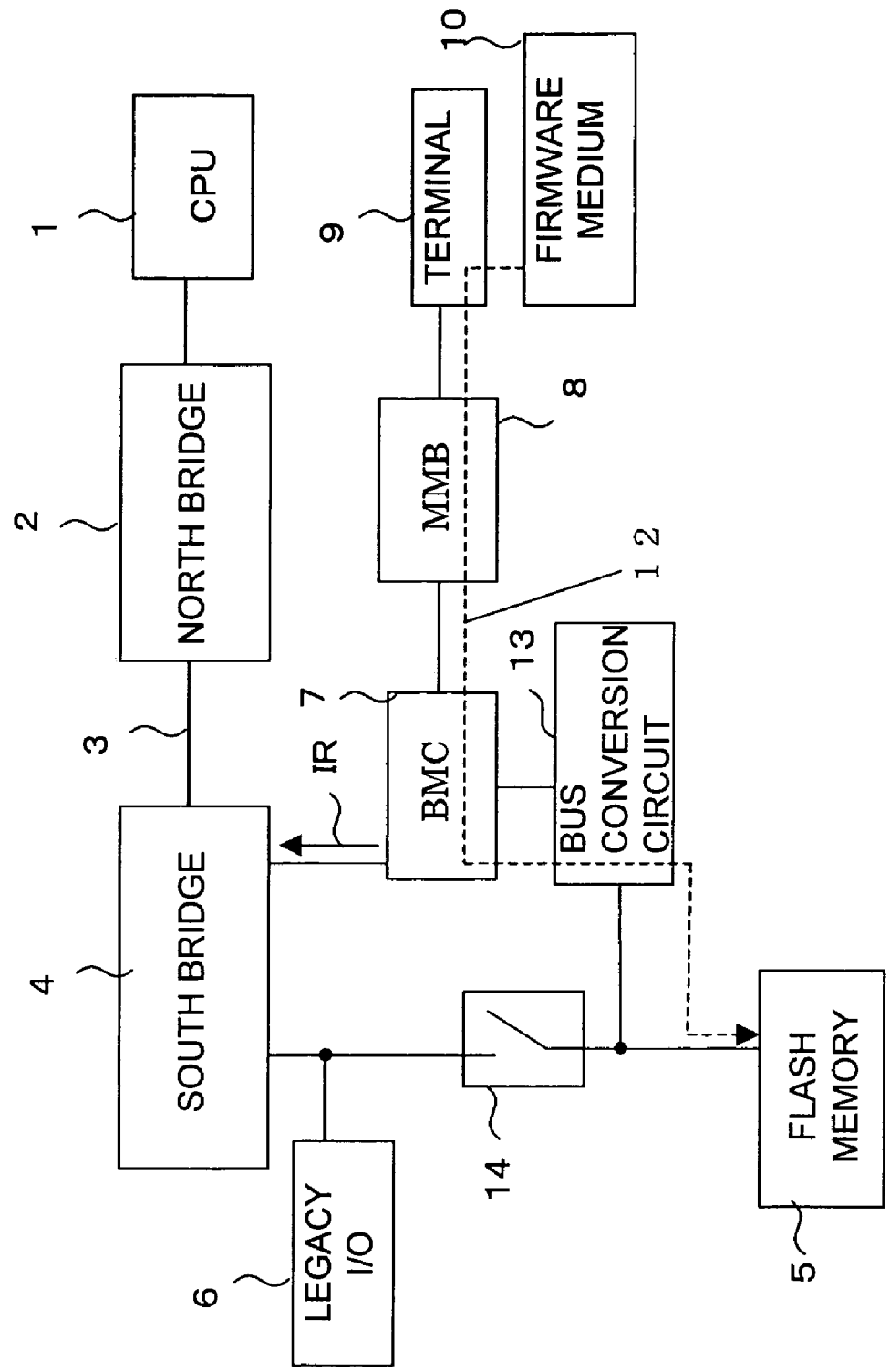
FIG. 3 is a block diagram of a first embodiment of a server system to which the present invention is applied.
Figure 4:
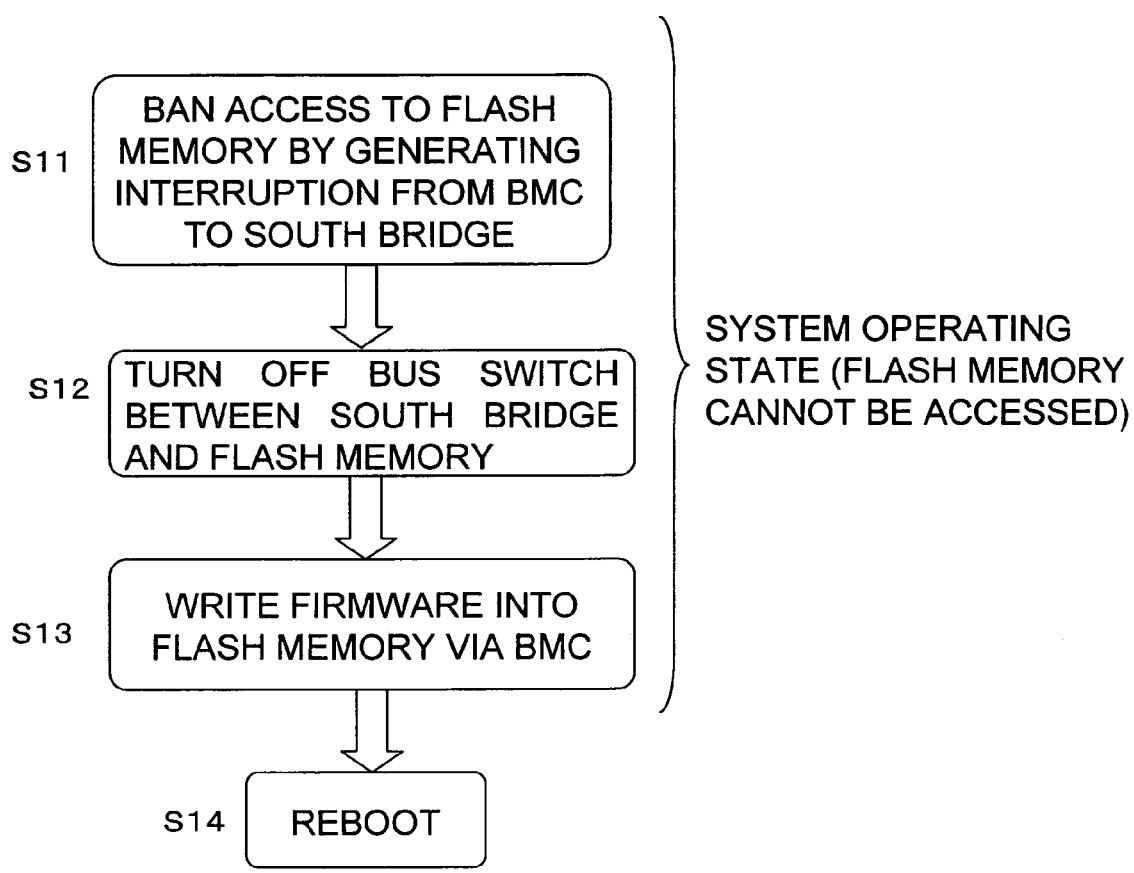
FIG. 4 shows an exemplary operation flow of a method of the present invention, corresponding to the embodiment of FIG. 3.

FIG. 3 is a block diagram of a first embodiment of a server system to which the present invention is applied. FIG. 4 is a corresponding exemplary operation flow of a method of the present invention.

In FIG. 3, only one system is illustrated, although a plurality of systems can be configured by sectionalizing with a plurality of partitions.

Figure 1:
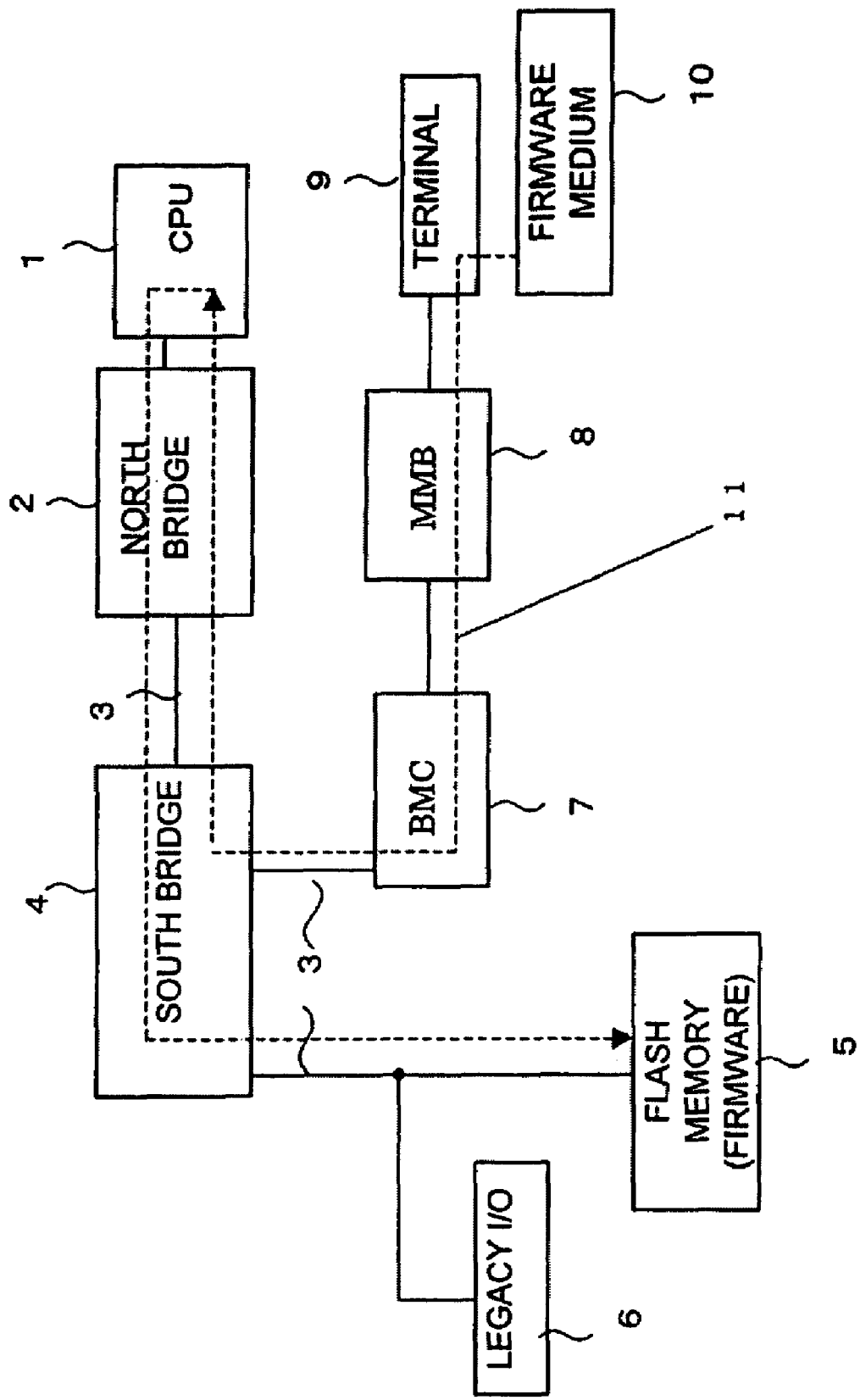
FIG. 1 is a diagram showing a conventional server system configuration.

As a characteristic of the present invention, a bus switch 14 is included in the configuration of FIG. 1, which is controlled by a management board (MMB) 8.

A bus conversion circuit 13 shown in FIG. 3 is a circuit which has a function for converting a bus system if a bus system of a base-board management controller (BMC) 7 is different from a bus system of a flash memory 5. If the function of the bus conversion circuit 13 is located within the base-board management controller (BMC) 7, the separate bus conversion circuit 13 does not have to be prepared.

In the present invention, an OS must include certain function, which is the function for interrupting a south bridge 4 from the base-board management controller (BMC) 7.

Describing in accordance with the flow of FIG. 4, when the flash memory 5 is updated, the south bridge 4 is interrupted from the base-board management controller (BMC) 7 due to the interrupt function IR included in the OS by a command from a user (step S11).

Simultaneously, the management board (MMB) 8 sets the bus switch between the south bridge 4 and the flash memory 5 to no-connection (OFF) (step S12). Also, the updating firmware is written into the flash memory 5 via the base-board management controller (BMC) 7 (step S13). At this point, the bus system of the base-board management controller (BMC) 7 is matched with the bus system of the flash memory 5 by the bus conversion circuit 13.

Then, after writing of the updating firmware is completed, the system is rebooted (step S14). Therefore, subsequently, the system can be operated by the updated firmware.

Figure 2:
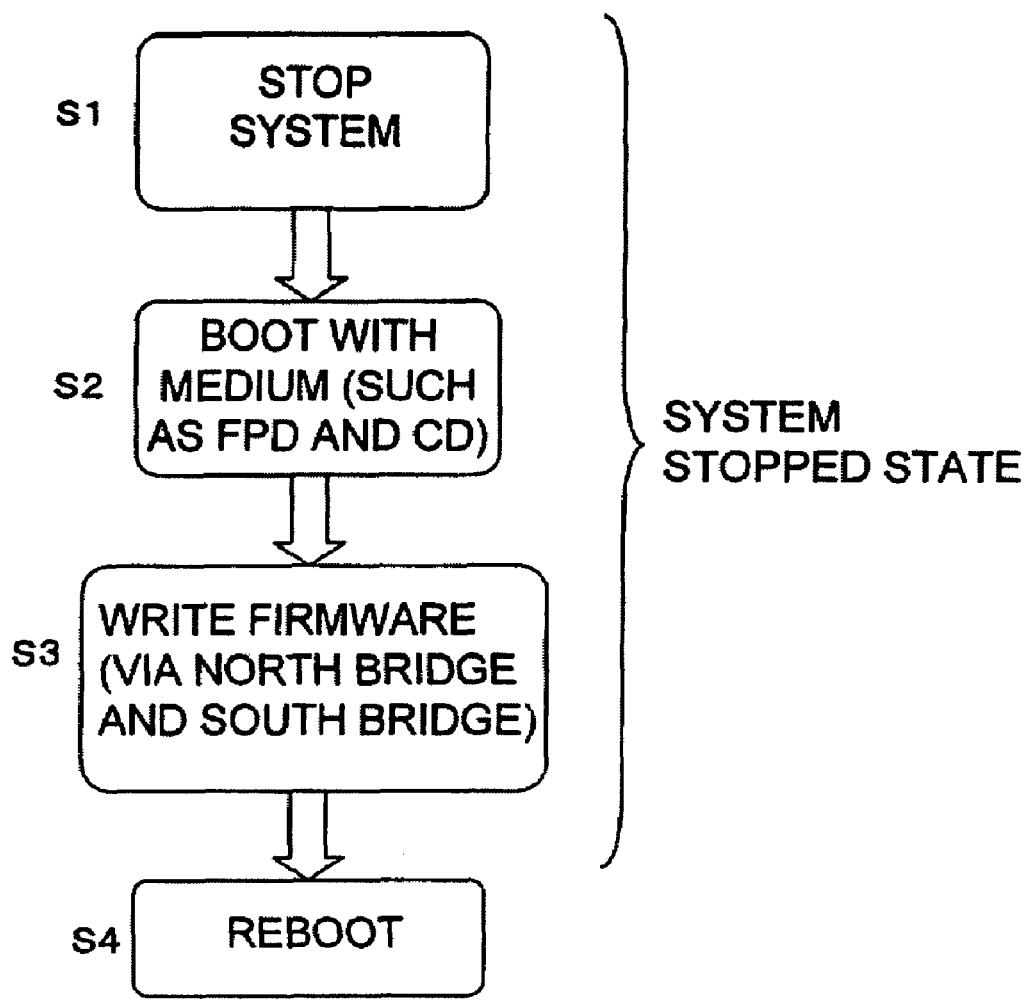
FIG. 2 is a diagram showing a processing flow at the time of the firmware update.

In this way, in the present invention, the system does not have to be in a stopped state before the firmware update. Therefore, an amount of time required for the update can be reduced in comparison to the conventional update shown in FIG. 1 and FIG. 2.

Although the method shown in FIG. 3 and FIG. 4 can reduce the amount of time required for the update, during the update period, the flash memory cannot be accessed (see the flow of FIG. 4). Therefore, the system operations are limited for the portion which needs to access the flash memory 5.

Figure 5:
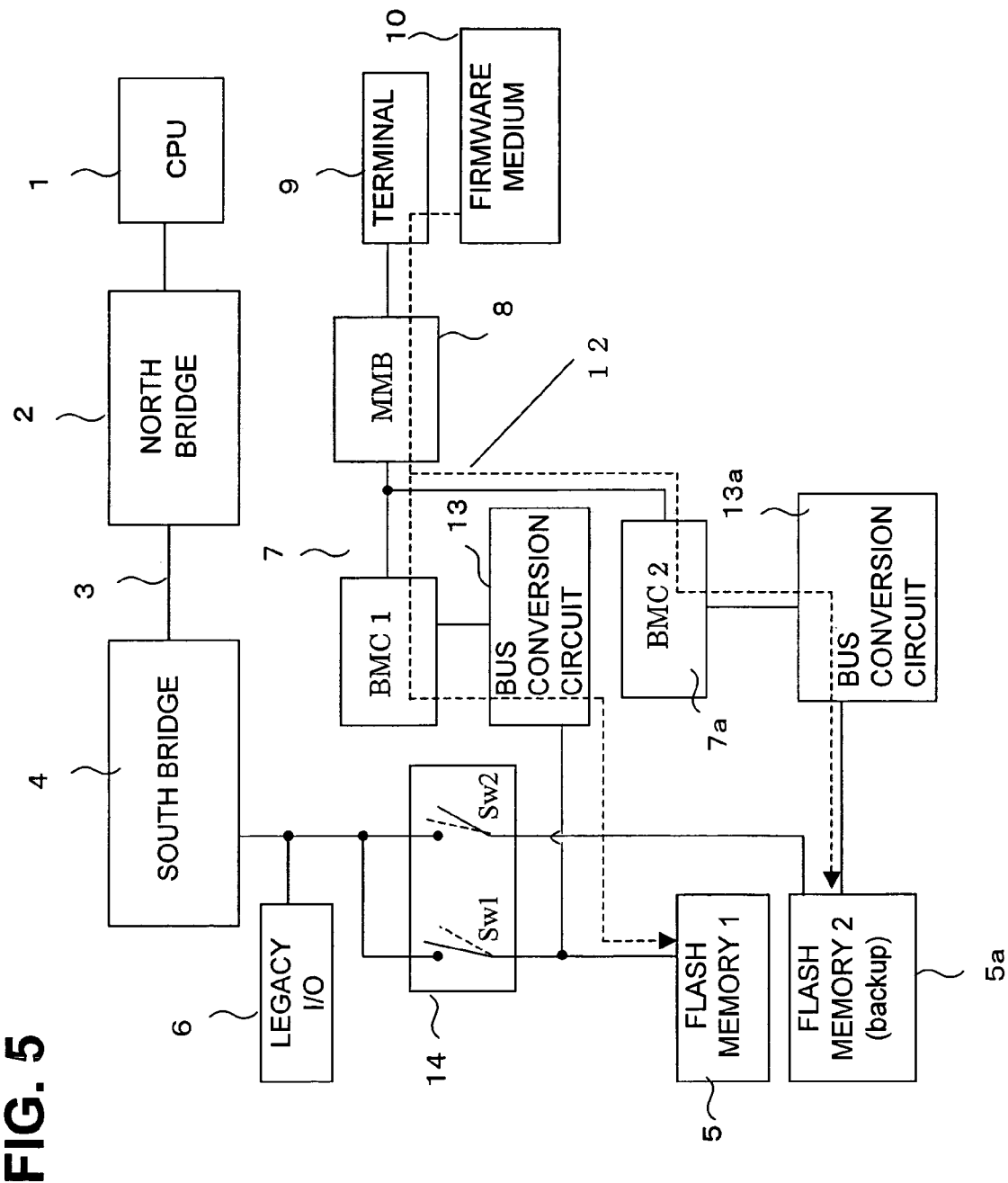
FIG. 5 is a block diagram of a second embodiment of a server system to which the present invention is applied.
Figure 6:
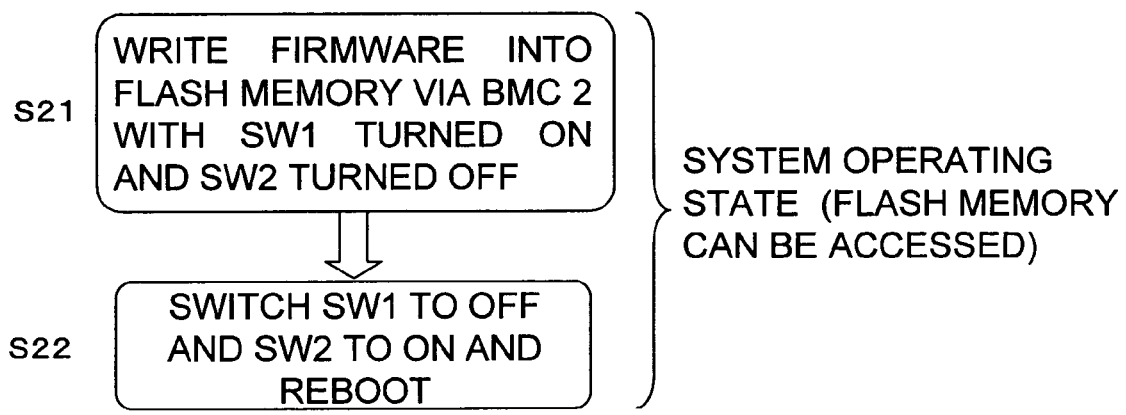
FIG. 6 shows an exemplary operation flow of a method of the present invention, corresponding to the embodiment of FIG. 5.

FIG. 5 is a block diagram of a second embodiment according to the present invention, which resolves such a drawback. FIG. 6 is a corresponding exemplary operation flow of a method of the present invention.

As a feature, the embodiment shown in FIG. 5 has a backup flash memory 5a corresponding to a backup base-board management controller (BMC) 7a, in addition to a flash memory 5 corresponding to a base-board management controller (BMC) 7.

Also in FIG. 6, only one system is illustrated, although a plurality of systems can be configured by partitioning with a plurality of partitions.

In accordance with the processing flow of FIG. 6, description will be made for a firmware update in the second embodiment.

A switch 14 has a switch Sw1 for connecting a south bridge 4 with a first flash memory (referred to as an active flash memory) and a switch Sw2 for connecting the south bridge 4 with a second flash memory (referred to as a backup flash memory).

In the operating state of the system, when the switch Sw1 is in a closed state and the switch Sw2 is in an open state, it is considered that the first flash memory 5 is active and the second flash memory 5a is for backup.

In this state, the updating firmware is read from a firmware medium 10 by a terminal 9 and is written into the backup, i.e. second, flash memory 5a via the second base-board management controller (BMC) 7a (step S21).

After the firmware is written into the second flash memory 5a, the system is rebooted (step S22). At this point, the management board 8 controls the switch 14 to switch over the switch Sw1 into the open state and switch Sw2 into the closed state.

Therefore, the second flash memory 5a is connected to the south bridge 4. In this way, when rebooted, the system is booted by the firmware updated by the second flash memory to be operated. Then, the first base-board management controller (BMC) 7 and the first firmware 5 will be for backup.

According to the second embodiment, the active flash memory is not updated when the system is operating, and the updating firmware is written into the backup flash memory. When rebooted, the backup flash memory storing the updated firmware acts as the active flash memory. According to the second embodiment, the system is not affected at all during the operation.

By virtue of the present invention, when firmware is updated, system down time can be minimized, or the update can be performed without banning access from a south bridge to firmware. This reduces effect of the update of the firmware when the system is operating and makes great industrial contributions.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A server system booted by firmware stored in a flash memory, the server system comprising:
   a CPU;
   a south bridge;
   a flash memory to store firmware;
   a switch connected to the south bridge and the flash memory; and
   a management controller, connected to the south bridge through a first path, to the flash memory through a second path, and to a terminal through a third path, wherein
   when the firmware stored in the flash memory is updated, the management controller interrupts the south bridge through the first path to ban an access to the flash memory by the CPU by controlling the switch to disconnect a connection between the south bridge and the flash memory, and writes updating firmware input from the terminal to the flash memory through the second path, wherein
   a rebooting of the server system is executed based on the updating firmware.

2. The server system according to claim 1, wherein
   the flash memory and the management controller connected to the flash memory correspond to one (1) system of a plurality of systems split into partitions.

3. The server system according to claim 1, further comprising:
   a bus conversion unit connected between the management controller and the flash memory, that matches a bus system corresponding to the south board and a bus system corresponding to the flash memory.

* * * * *